Jan. 28, 1964   H. W. TREVASKIS   3,119,581
SECURING MEANS FOR INFLATABLE INLET DEVICE
Filed June 7, 1961   3 Sheets-Sheet 3
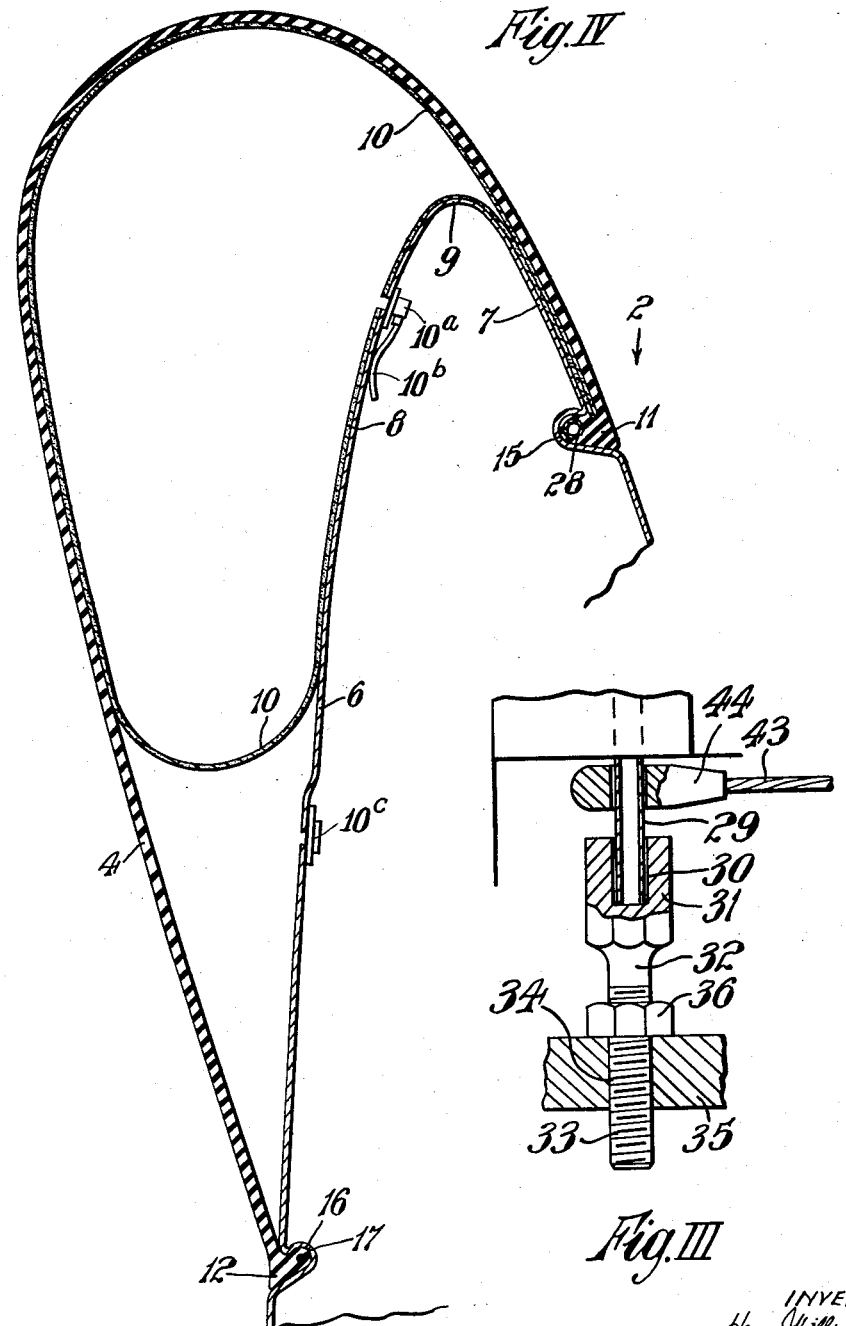
INVENTOR
Henry William Trevaskis
by Benj. T. Rauber
his attorney United States Patent Office 3,119,581
Patented Jan. 28, 1964

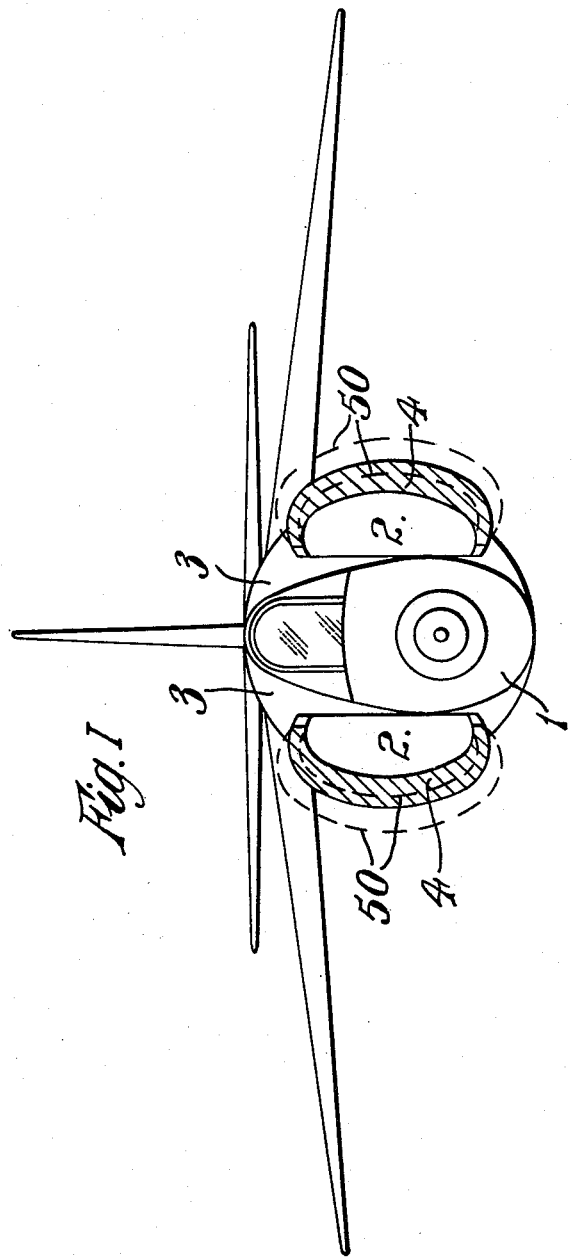

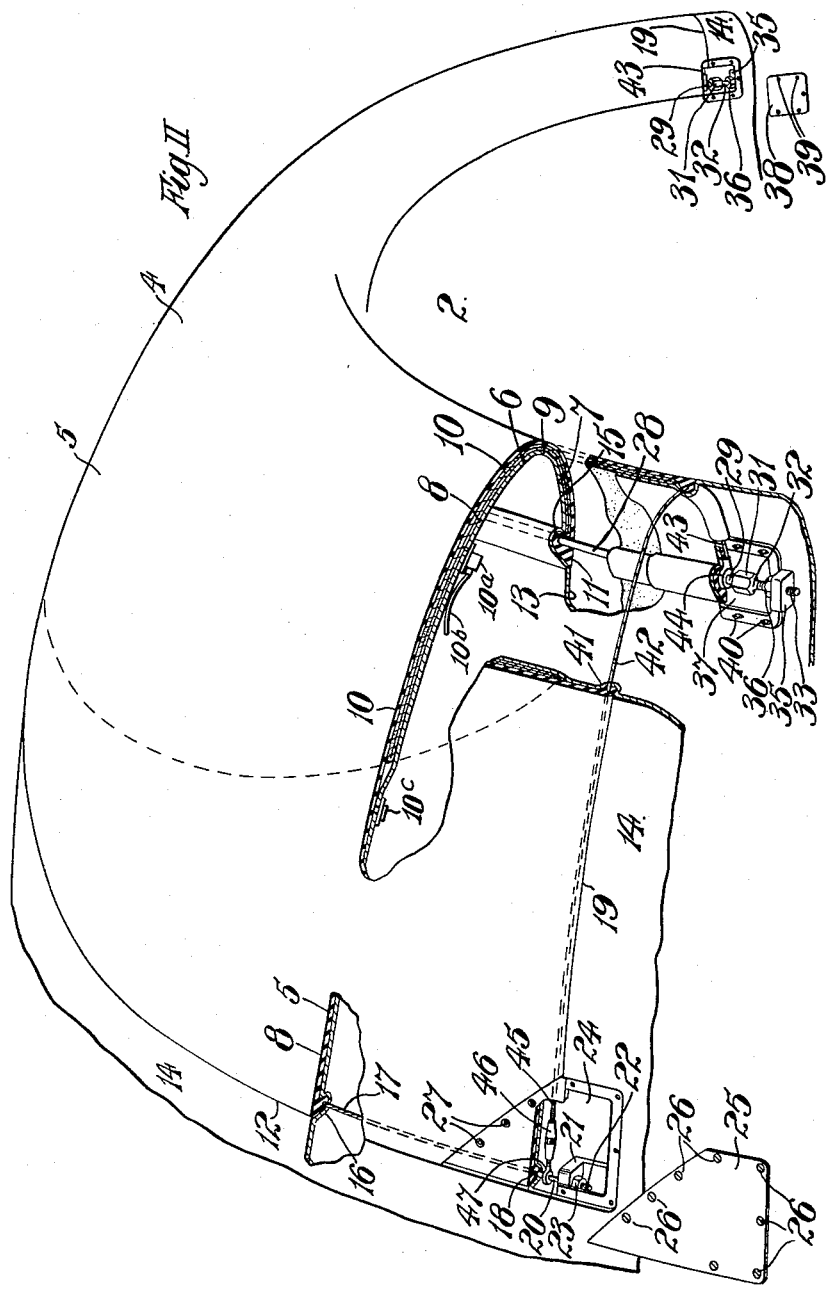

3,119,581
SECURING MEANS FOR INFLATABLE
INLET DEVICE
Henry William Trevaskis, Blackdown, near Leamington Spa, England, assignor to Dunlop Rubber Company Limited, London, England, a British company
Filed June 7, 1961, Ser. No. 115,362
Claims priority, application Great Britain June 18, 1960
12 Claims. (Cl. 244—53)

This invention relates to a flexible device and more particularly relates to such a device comprising means by which it may be detachably and, if necessary, fluid-tightly, secured to a supporting structure. The invention relates also to an inflatable, flexible device for modifying the air intake characteristics of an aircraft jet engine.

It is frequently necessary to temporarily enlarge the air intake orifice of a jet engine when the aircraft is taking off in high ambient temperatures and/or from elevated airfields in order to allow an increased volume of air to pass to the combustion chamber of the engine, thereby temporarily increasing its efficiency at a critical period. This may be accomplished by fitting a flexible, inflatable device to the air intake cowling which normally lies smooth and flush with the surfaces of the intake, to which it may be held by vacuum means, so that it does not disturb the air flow when the aircraft is in normal flight but which may be inflated, by means under the control of the pilot of the aircraft, to distend and so modify the section of the intake that the effective frontal area defined thereby is increased.

The shape of the air intake is frequently a complex curve and since one edge of the inflatable device must be detachably and fluid-tightly fitted to the inner periphery thereof and another edge to the outer periphery, the method of securing has provided a problem.

The object of the present invention is to provide a flexible device which can readily be detachably, and if necessary, fluid-tightly, secured to a curved portion of a supporting structure.

The present invention provides for a flexible device having at least one edge adapted to be secured to the inner concave surface of a curved supporting structure, said edge comprising a beaded portion having a reinforcement comprising a strut which is adapted to be loaded in compression between abutments provided by said supporting structure.

Preferably, the strut comprises a tubular member which is located in a groove formed in said inner concave surface and means are provided for loading the strut in compression between its ends so that it can take the shape of the groove in said inner surface.

The invention also provides for a flexible device having at least one edge adapted to be secured to the outer convex surface of a curved supporting structure, said edge comprising a beaded portion having a reinforcement comprising a filamentary material which is adapted to be placed in tension.

Preferably, the filamentary material comprises a metallic twisted wire or stranded cable which is located in a groove in said outer surface and is anchored thereto at its ends, turnbuckle or like means being provided to put the wire or cable under tension when fitted.

The invention is particularly applicable to an inflatable device for an aircraft jet engine air intake since the beaded edges of the device can be made to fluid-tightly engage the grooves in the supporting structure.

One form of flexible device in accordance with the invention will now be described by way of example with reference to the accompanying drawings, in which:

FIGURE I is a front view of an aircraft having flexible devices fitted to its jet engine air intakes, FIGURE II is a fragmentary perspective view of a flexible device as shown in FIGURE I, FIGURE III is an enlarged view of part of the device, and FIGURE IV is a cross-sectional elevation of the device when inflated.

As shown in FIGURE I an aircraft 1 having two jet engine air intakes 2 positioned one on each side of the fuselage 3 is provided with a flexible device 4 secured to the surfaces of the air intakes 2. The flexible device 4 is shown in more detail in FIGURE II and comprises a sheet 5 of rubber or rubber-like material tailored and shaped to the surface 6 of the intake 2 to which it is fitted. The intake is shaped in the form of substantially half a cylinder, the inner concave surface 7 and outer convex surface 8 of which taper away from one another from the end 9 which comprises a leading edge of the intake. The device 4 fits over these surfaces to a depth of the order of 8 to 10 inches on the outer surface 8 and 1 to 2 inches on the inner surface 7.

An inflatable sac or bag 10 is positioned between said device 4 and the surface 6 of the intake 2, extending from the inner peripheral edge 11 of the device around the leading edge 9 and terminating approximately midway to the outer peripheral edge 12. The bag is provided with inflation means, e.g. a valve 10a and a supply 10b of compressed air which can be controlled by the pilot. The inner surface 7 and outer surface 8 are each shaped so that the flexible device 4 will lie closely-adjacent to the surface and will be flush with the surfaces 13 and 14 of the fuselage, thereby permitting a smooth flow of air over the surface in flight. A connection 10c to a vacuum source is provided in the surface of the intake in order that the rubber sheet 5 should be held firmly against the surfaces of the intake and this prevents distortion and wrinkles during flight.

The surfaces 7 and 8 of the intake are each provided with a groove, one groove 15 extends around the inner surface 7 whilst the other groove 16 extends around the outer surface 8. Grooves 15 and 16 are each aligned with the respective peripheral edges 11 and 12 of the device. The bottom of each groove is rounded and the grooves are not symmetrical about a line bisecting the section thereof but are inclined forwardly towards the leading edge 9 of the intake 2.

Each edge 11 and 12 of the device is beaded, i.e. it comprises a longitudinally-extending reinforcement around which is wrapped a margin of the rubber or rubber-like material comprising the device. The reinforcement of the outer peripheral edge 12, which co-operates with the outer convex surface 8 of the intake 2 comprises a flexible twisted metal wire 17 or wire cable of the kind used in pneumatic tire beads. Each end 18 of this wire projects beyond the axial edge 19 of the device 4 and is secured to rod 20 passing slidably-through an abutment 21 secured to, or formed integral with, the surface 14. The end 22 of the rod 20 outwardly of the wire 17 is threaded and carries a nut 23 by which the wire 17 can be tensioned after the device 4 has been fitted to the intake 2 so that the beaded edge 12 is retained in fluid-tight manner in the groove 16. To enable the securing means to be inspected and tightened, a window 23 is cut in the surface 14 and the surface surrounding the window and the adjacent corner of the device 4 are reduced in thickness so that a cover-plate 25 can be secured flush with the surface 14 by means of screws 26 and captive nuts (not shown). Cylindrical distance pieces 27 are provided in the corner of the device 4 to avoid distortion thereof as the screws 26 are tightened.

Whilst the above method of securing is suitable for the outer convex surface 8, it is obviously unsuitable for the inner concave surface 7 and accordingly, the reinforcement for the inner peripheral edge 11 comprises a strut 28. The strut 28 is metallic and tubular and is sufficiently resilient to conform to the curved inner groove 15. Each end 29 of the strut 28 is rotatably-located in an axial central chamber 30 drilled in the head 31 of a bolt 32, the threaded portion 33 of which is screwed into a threaded hole 34 of an abutment 35 secured to the inner concave surface 7. A lock-nut 36 is provided on said threaded portion 33 to permit the position of the bolt 32 to be adjusted in relation to the abutment 35. The bolt 32 is screwed outwardly of said abutment 35, thereby putting the strut 28 under compression and the beaded edge 11 is fluid-tightly retained in the groove 15. The compression means is shown in more detail in FIGURE III and such means may be provided at one or both ends of the strut 28. A window 37 is cut in the inner surface 13 to enable inspection and fitting of the strut 28 in the groove 15. A cover-plate 38 is detachably-secured to the window by means of screws 39 and captive nuts 40.

Axial grooves 41 aligned with the axial edges 19 of the device 4 are provided in said inner concave surfaces 7 and outer convex surface 8 from a point adjacent the groove 15 to a point adjacent the groove 16. The axial edges 19 of the device 4 are beaded and provided with a flexible twisted wire reinforcement 42, one end 43 of which is secured to a metal eye 44 slidably carried on the end 29 of the strut 28. The other end 45 of the wire reinforcement 42 is secured by means of a turnbuckle 46 and eye-bolt 47 to the rod 20 secured to the metal wire 17 forming the reinforcement for the outer peripheral edge 12. The reinforcement 42 is tensioned by means of the turnbuckle and the edge 19 is retained fluid-tightly in the groove 41.

In operation, the inflatable bag 10 is inflated before the aircraft is to take off from the runway, and the flexible device 4 thereby expanded outwardly of said outer convex surface 8 to increase the effective area of the intake 2 as shown in FIGURE IV. This is also shown in FIGURE I where the dotted lines 50 indicate the outline of the device in its inflated position. The volume of air passing to the combustion chamber of the jet engine is thereby increased, bringing about a corresponding increase in the thrust and enabling the aircraft to take off more easily. When the aircraft is airborne, the inflatable bag 10 is deflated and the vacuum means operated to cause the flexible device 4 to lie closely-adjacent the surface 6 of the intake, thereby presenting substantially no interference with the flow of air over the surface of the aircraft.

The device of the kind described may be detachably and easily secured to any type of rounded surface and, if necessary, fluid-tight engagement can be effected.

Having now described my invention—what I claim is:

1. A flexible device having at least one edge adapted to be secured to the inner concave surface of a curved supporting structure and said edge comprising a beaded portion having a reinforcement comprising an incompressible, flexible, element extending lengthwise in contact with said beaded portion and fixed means supporting said element at the ends of said bead at least one of said fixed means comprising means to apply a compressive force lengthwise of and against said element to cause it to bow against said inner concave surface of the supporting element.

2. A flexible device according to claim 1 wherein said element is a tubular member located in said bead.

3. A flexible device according to claim 1 having at least one additional edge adapted to be secured to the outer convex surface of said supporting structure, said edge comprising a beaded portion having a reinforcement comprising a filamentary material adapted to be placed in tension.

4. A flexible device according to claim 3 wherein said bead and filamentary material are located in a groove in said outer surface and anchored thereto at its ends and provided with means to put the material under tension.

5. A flexible device according to claim 1 comprising a sheet of an elastomeric material shaped to the surface of a jet engine air intake, the edges of said sheet being secured fluid-tightly to the inner concave surface and outer convex surfaces of said intake, means to inflate said sheet outwardly of said outer concave surface, and means to retain said sheet closely-adjacent said surface when deflated.

6. A flexible device according to claim 5 wherein said inflation means comprises an inflatable sac positioned between said sheet and said outer convex surface.

7. A flexible device according to claim 5 wherein said means to retain said sheet closely-adjacent said surface, when deflated, comprises a connection to a source of vacuum, whereby the space between said sheet and said outer surface can be evacuated, causing said sheet to lie close to said surface.

8. A flexible device according to claim 5, wherein said sheet of rubber or rubber-like material has the shape of substantially half a cylinder having a beaded portion at each axial edge and a reinforcement for said beaded portion comprising a filamentary material adapted to be placed in tension, and located fluid-tightly in a groove in said outer convex surface and inner concave surface.

9. A flexible device according to claim 1 wherein said incompressible, flexible, element is provided at one or both ends with a threaded member adapted to be screwed, extending axially from said supporting means, whereby movement of said member in an axial direction outwardly of said abutment places said incompressible flexible element under compression and ensures that said incompressible flexible element conforms to the groove in said inner concave surface.

10. A flexible device according to claim 3 wherein said filamentary material located in said groove in said outer concave surface is provided at one or both ends with a turnbuckle to effect tensioning of said filamentary material.

11. An expansible intake for a jet engine which comprises an intake element curved about an axis and having a convex outer portion and a concave inner portion and having a circumferential groove in said outer portion recessed radially inwardly toward said axis and a circumferential groove in said inner portion recessed radially outwardly relative to said axis of said element and a pair of spaced connecting grooves connecting said circumferential grooves to enclose an area of said inner and outer surfaces, a sheet of elastomeric material conforming to the inner and outer surfaces of said intake element within said area and having beads fitting into said grooves, each said bead comprising a reinforcement, means for placing the bead in the coaxial groove in said inner surface under linear compression to force said bead into its said groove, means to place the reinforcements of said other grooves under tension to draw them into their respective grooves and means to inflate said sheet within said area.

12. The intake of claim 11 in which said means to inflate said sheet comprises a flat bag between said sheet and said intake element and inflatable to expand said sheet axially forwardly and radially outwardly of said element.

References Cited in the file of this patent

UNITED STATES PATENTS

| | | |
|---|---|---|
| 2,409,433 | Hunter | Oct. 15, 1946 |
| 2,726,056 | Tatom et al. | Dec. 6, 1955 |

FOREIGN PATENTS

| | | |
|---|---|---|
| 197,092 | Great Britain | May 10, 1923 |